United States Patent
Klotzbuecher et al.

(10) Patent No.: US 11,061,127 B2
(45) Date of Patent: Jul. 13, 2021

(54) VEHICLE RADAR SYSTEM

(71) Applicant: VEONEER SWEDEN AB, Vargarda (SE)

(72) Inventors: Dirk Klotzbuecher, Mainstockheim (DE); Michael Paradie, Hollis, NH (US)

(73) Assignee: VEONEER SWEDEN AB, Vargarda (SE)

( * ) Notice: Subject to any disclaimer, the term of this patent is extended or adjusted under 35 U.S.C. 154(b) by 203 days.

(21) Appl. No.: 15/576,138

(22) PCT Filed: May 20, 2016

(86) PCT No.: PCT/EP2016/061412
§ 371 (c)(1),
(2) Date: Nov. 21, 2017

(87) PCT Pub. No.: WO2016/188895
PCT Pub. Date: Dec. 1, 2016

(65) Prior Publication Data
US 2018/0136324 A1    May 17, 2018

(30) Foreign Application Priority Data
May 25, 2015 (EP) ..................................... 15169067

(51) Int. Cl.
*G01S 13/34* (2006.01)
*G01S 7/35* (2006.01)
(Continued)

(52) U.S. Cl.
CPC ............ *G01S 13/343* (2013.01); *G01S 7/354* (2013.01); *G01S 13/584* (2013.01);
(Continued)

(58) Field of Classification Search
CPC .... G01S 13/343; G01S 13/584; G01S 13/726; G01S 13/931; G01S 7/354;
(Continued)

(56) References Cited

U.S. PATENT DOCUMENTS 3,745,571 A * 7/1973 Chwastyk ............. G01S 13/524
342/194
5,027,122 A * 6/1991 Wieler .................. G01S 13/227
342/26 D
(Continued)

FOREIGN PATENT DOCUMENTS

CN    1804655 A    7/2006
CN    1808176 A    7/2006
(Continued)

OTHER PUBLICATIONS

International Search Report and the Written Opinion of PCT/EP2016/061412, dated Jul. 20, 2016.
(Continued)

*Primary Examiner* — Erin F Heard
*Assistant Examiner* — Michael W Justice
(74) *Attorney, Agent, or Firm* — Dickinson Wright PLLC (57) ABSTRACT

A vehicle radar system including at least one transceiver arrangement (52) that is arranged to generate and transmit a least one FMCW chirp signal (4a, 4b). Each chirp signal (4a, 4b) includes a corresponding plurality of frequency ramps ($r_1$, $r_2$). The vehicle radar system (3) is arranged to receive reflected signals (5a, 5b) and to mix the received signals (5a, 5b) with the respective transmitted chirp signal (4a, 4b) to obtain at least one IF signal (14). The vehicle radar system (3) is further arranged to produce a periodically updated dwell list (34), and to collect and process data in dependence
(Continued)

of the present dwell list (34). The present dwell list includes information where the probability of presence of objects exceeds a certain threshold.

20 Claims, 7 Drawing Sheets

(51) Int. Cl.
  *G01S 13/58* (2006.01)
  *G01S 13/72* (2006.01)
  *G01S 13/931* (2020.01)
(52) U.S. Cl.
  CPC .......... *G01S 13/726* (2013.01); *G01S 13/931* (2013.01); *G01S 2007/356* (2013.01); *G01S 2013/93271* (2020.01)
(58) Field of Classification Search
  CPC ....... G01S 2007/356; G01S 2013/9375; G01S 13/18; G01S 13/53; G01S 13/532; G01S 13/64; G01S 13/276; G01S 13/524; G01S 13/5244; G01S 7/2922; G01S 7/021; G01S 7/292
  USPC .......................................... 342/70, 159, 160
  See application file for complete search history.

(56) References Cited

U.S. PATENT DOCUMENTS

| | | | |
|---|---|---|---|
| 5,416,488 A | 5/1995 | Grover et al. | |
| 5,959,574 A * | 9/1999 | Poore, Jr. | G01S 13/726 342/96 |
| 6,011,507 A * | 1/2000 | Curran | G01S 13/34 342/70 |
| 6,087,976 A | 7/2000 | Reed et al. | |
| 6,400,308 B1 * | 6/2002 | Bell | G01S 13/18 342/71 |
| 6,888,493 B2 * | 5/2005 | Driessen | G01S 7/2923 342/195 |
| 7,026,979 B2 * | 4/2006 | Khosla | G01S 13/726 342/140 |
| 7,639,171 B2 * | 12/2009 | Alland | G01S 13/524 342/25 R |
| 8,295,311 B2 * | 10/2012 | Guey | H04L 5/0048 370/509 |
| 8,390,507 B2 | 3/2013 | Wintermantel | |
| 8,436,763 B2 | 5/2013 | Wintermantel | |
| 8,593,333 B2 | 11/2013 | Wintermantel et al. | |
| 8,665,137 B2 | 3/2014 | Wintermantel | |
| 8,686,893 B2 | 4/2014 | Watanabe et al. | |
| 2004/0027274 A1 * | 2/2004 | Driessen | G01S 13/726 342/91 |
| 2005/0001759 A1 * | 1/2005 | Khosla | G01S 13/726 342/90 |
| 2006/0152405 A1 * | 7/2006 | Egri | G01S 13/931 342/70 |
| 2006/0262007 A1 * | 11/2006 | Bonthron | G01S 13/44 342/70 |
| 2007/0001897 A1 | 1/2007 | Alland | |
| 2007/0273574 A1 * | 11/2007 | Barnum | G01S 13/0218 342/90 |
| 2009/0015460 A1 * | 1/2009 | Fox | G01S 13/886 342/53 |
| 2009/0085800 A1 * | 4/2009 | Alland | G01S 13/931 342/25 R |
| 2010/0238787 A1 * | 9/2010 | Guey | H04L 27/2657 370/208 |
| 2011/0025546 A1 * | 2/2011 | Cook | G01S 7/2923 342/22 |
| 2014/0361919 A1 * | 12/2014 | Pomerance | G01S 7/2927 342/27 |
| 2016/0231423 A1 * | 8/2016 | Enderli | G01S 13/87 |
| 2017/0059692 A1 * | 3/2017 | Laufer | F41G 7/2253 |

FOREIGN PATENT DOCUMENTS

| | | | | |
|---|---|---|---|---|
| CN | 101373218 A | 2/2009 | | |
| CN | 103852762 A | 6/2014 | | |
| CN | 104251987 A | 12/2014 | | |
| EP | 2045877 A1 * | 4/2009 | ............ | G01S 7/034 |
| EP | 2 045 877 A1 | 8/2009 | | |
| EP | 2462462 B1 | 12/2013 | | |
| JP | 2011-526373 A | 10/2011 | | |
| JP | 2011-232053 A | 11/2011 | | |
| JP | 2012-112653 A | 6/2012 | | |
| JP | 2015-180858 A | 10/2015 | | |

OTHER PUBLICATIONS

Search Report in Corresponding Chinese application 201680030428.8 prepared Jun. 30, 2020.

* cited by examiner

VEHICLE RADAR SYSTEM

CROSS-REFERENCE TO RELATED APPLICATIONS

This application is a 35 U.S.C. § 371 national phase application of PCT International Application No. PCT/EP2016/061,412, filed May 20, 2016, which claims the benefit of priority under 35 U.S.C. § 119 to European Patent Application No. 15169067.4, filed May 25, 2015, the contents of which are incorporated herein by reference in their entirety.

FIELD OF THE INVENTION

The present disclosure relates to a vehicle radar system including at least one transceiver arrangement arranged to generate, transmit a least one FMCW (Frequency Modulated Continuous Wave) chirp signal, and to receive reflected signals.

BACKGROUND

Many vehicle radar systems include a system for generating so-called chirp signals that are transmitted, reflected and received by use of appropriate antennas present in the radar system. A chirp signal is an FMCW (Frequency Modulated Continuous Wave) signal with a certain amplitude where the frequency is continuously ramped between two values, the chirp signal thus being in the form of a continuous sinusoid where the frequency varies from a first low frequency to a second high frequency over the course of the ramp. The change in frequency from start to finish, the bandwidth, may for example be of the order of 0.5% of the starting frequency.

The received signals, thus constituted by reflected radar echoes, are mixed with the transmitted chirp signal in order to convert the received signals to baseband signals. These baseband signals, or IF (Intermediate Frequency) signals, are amplified and transferred in a plurality of channels to an Analog To Digital Converter (ADC) arrangement which is arranged to convert the received analog signals to digital signals. The digital signals are used for retrieving an azimuth angle of possible targets by simultaneously sampling and analyzing phase and amplitude of the received signals. The analysis is generally performed in one or more Digital Signal Processors (DSP) by use of Fast Fourier Transform (FFT) processing.

A vehicle radar system may be used for detecting other vehicles, fixed objects and pedestrians, where pedestrian protection will become of an increased importance. For detection of pedestrians, a radar system should be able to detect objects such as pedestrians at a sufficient distance and to classify detected objects as pedestrians if that is the case, being able to resolve a pedestrian from clutter.

It is possible to obtain object resolution with one or more of the three measurement categories described as follows.

Category 1): The range resolution follows a function of Tx (transmit) frequency bandwidth (i.e. BW). Typically, the bandwidth is limited for regulatory reasons.

$R_{res} = \frac{1}{2} \cdot C_0 / BW$

Category 2): The angular resolution can be estimated as a function of the effective antenna aperture (i.e. $D_{eff}$).

$\Theta_{res} \neq \frac{1}{2} \cdot \pi \cdot \lambda / D_{eff}$

Category 3): The Doppler is calculated as a function of the so-called dwell time (i.e. $T_d$). A radar dwells at a particular discrete range to search for the presence of objects at that range before indexing to the next in a sequence of discrete ranges.

$V_{res} = \frac{1}{2} \cdot C_0 / (T_d \cdot F_0)$

Since the transmitted chirp signals should be within a certain bandwidth, the resulting range resolution may not be satisfactory to differentiate between pedestrian and clutter in various scenarios.

Furthermore, a high azimuth angular resolution requires a large antenna dimension which is unattractive for an automotive radar sensor.

Regarding dwell time, the velocity resolution should preferably be at least 0.5 km/h (or in other words 14 ms dwell time @ 77 GHz). However, the amount of data to be processed increases linearly with recording time, which has implications for both processor load and memory consumption.

It is thus a desire to provide a vehicle radar system where the need for memory and processor capacity is reduced, such that cost, complexity and heat generation is decreased.

The object of the present disclosure is thus to provide a vehicle radar system where the need for memory and processor capacity is reduced, such that cost, complexity and heat generation is decreased.

SUMMARY

This object is obtained by of an embodiment of this invention in the form of a vehicle radar system including at least one transceiver arrangement that is arranged to generate and transmit a least one FMCW (Frequency Modulated Continuous Wave) chirp signal. Each chirp signal includes a corresponding plurality of frequency ramps. The vehicle radar system is arranged to receive reflected signals and to mix the received signals with the respective transmitted chirp signal to obtain at least one IF (Intermediate Frequency) signal. The vehicle radar system is further arranged to produce a periodically updated dwell list, and to collect and process data in dependence of the present dwell list. The dwell list includes information where the probability of presence of objects exceeds a certain threshold.

This object of the invention is also obtained by a method for a vehicle radar system, where the method includes:
Generating at least one FMCW (Frequency Modulated Continuous Wave) chirp signal.
Transmitting the at least one chirp signal, where each chirp signal includes a corresponding plurality of frequency ramps.
Receiving reflected signals.
Mixing the received signals with the respective transmitted chirp signal to obtain at least one IF (Intermediate Frequency) signal.
Producing a periodically updated dwell list.
Collecting and processing data in dependence of the present dwell list.
The dwell list includes information where the probability of presence of objects exceeds a certain threshold.

According to an example of the present invention, each of the at least one transceiver arrangement is arranged to:
Convert the IF signals to digital signals,
Convert the digital signals to a range domain by use of a first FFT (Fast Fourier Transform), and to
Combine the results from successive chirp signal ramps into the Doppler domain by use of a second FFT, such that a plurality of Range-Doppler matrices is obtained.

According to another example embodiment of the present invention, the vehicle radar system is arranged to feed the two-dimensional spectrum of each Range-Doppler matrix into a first processing path and a second processing path. The first processing path is arranged to produce the dwell list, and the second processing path is arranged to collect and process data from each Range-Doppler matrix in dependence of the dwell list.

According to another example embodiment of the present invention, each transceiver arrangement includes a signal generator and is arranged to transmit a first chirp signal a second chirp signal. These chirp signals may for example be timed to be interleaved with each other.

According to another example embodiment of the present invention, each chirp signal includes a corresponding plurality of frequency ramps, where each pulse block has a duration of a block time with an idle time between two consecutive pulse blocks. Each pulse block includes the chirp signal and during the idle time, there is no chirp signal.

According to another example embodiment of the present invention, the radar system is arranged to combine pulse blocks by use of a Sequential Probability Ratio Test (SPRT) algorithm.

Other examples are disclosed in this description.

A number of advantages are obtained by of embodiments in accordance with the present disclosure. Mainly, cost, complexity and heat generation is decreased.

BRIEF DESCRIPTION OF THE DRAWINGS

The present disclosure will now be described more in detail with reference to the appended drawings, where.

DETAILED DESCRIPTION

Figure 1:
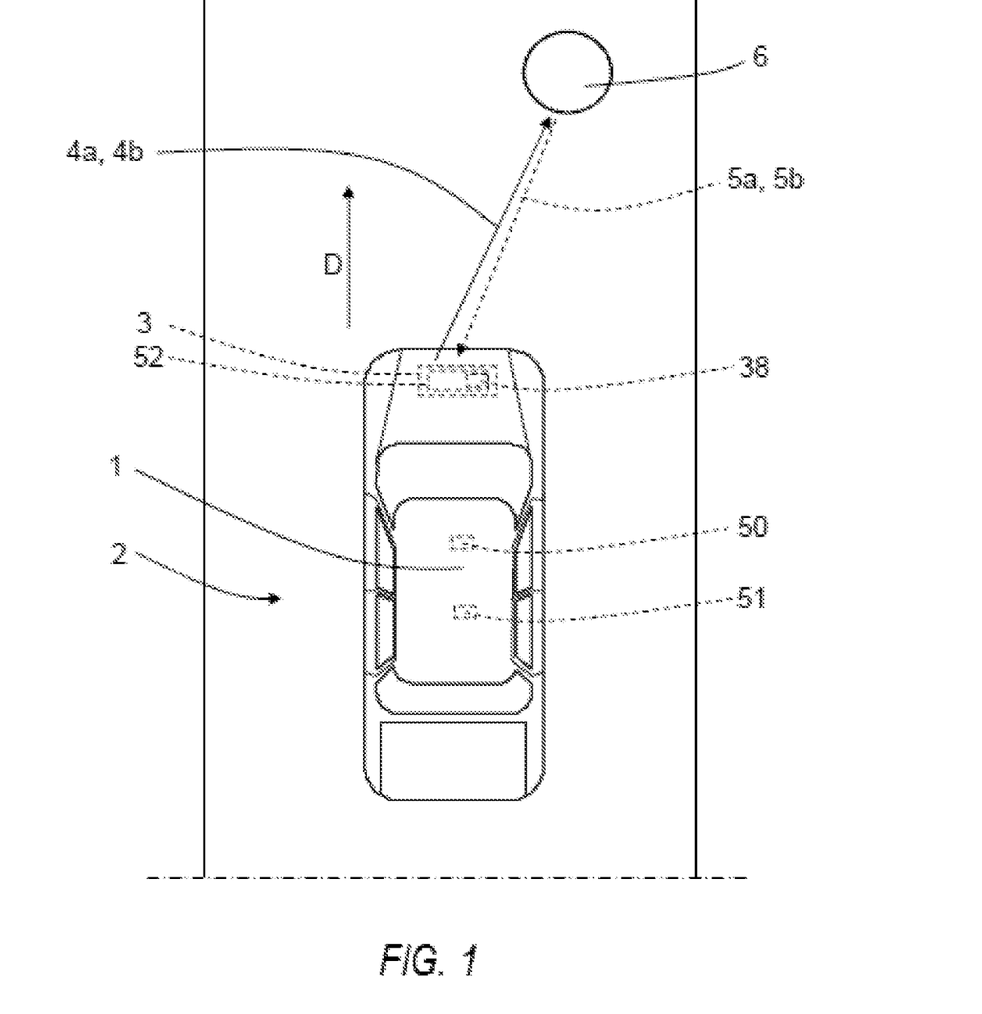
FIG. 1 shows a schematic top view of a vehicle.

FIG. 1 schematically shows a top view of a vehicle 1 arranged to run on a road 2 in a direction D, where the vehicle 1 includes a vehicle radar system 3 which is arranged to distinguish and/or resolve single targets from the surroundings by transmitting signals 4a, 4b and receiving reflected signals 5a, 5b and using a Doppler effect in a previously well-known manner. The vehicle radar system 3 is arranged to provide azimuth angles of possible objects 6, 7 by simultaneously sampling and analyzing phase and amplitude of the received signals 5a, 5b.

Figure 2:
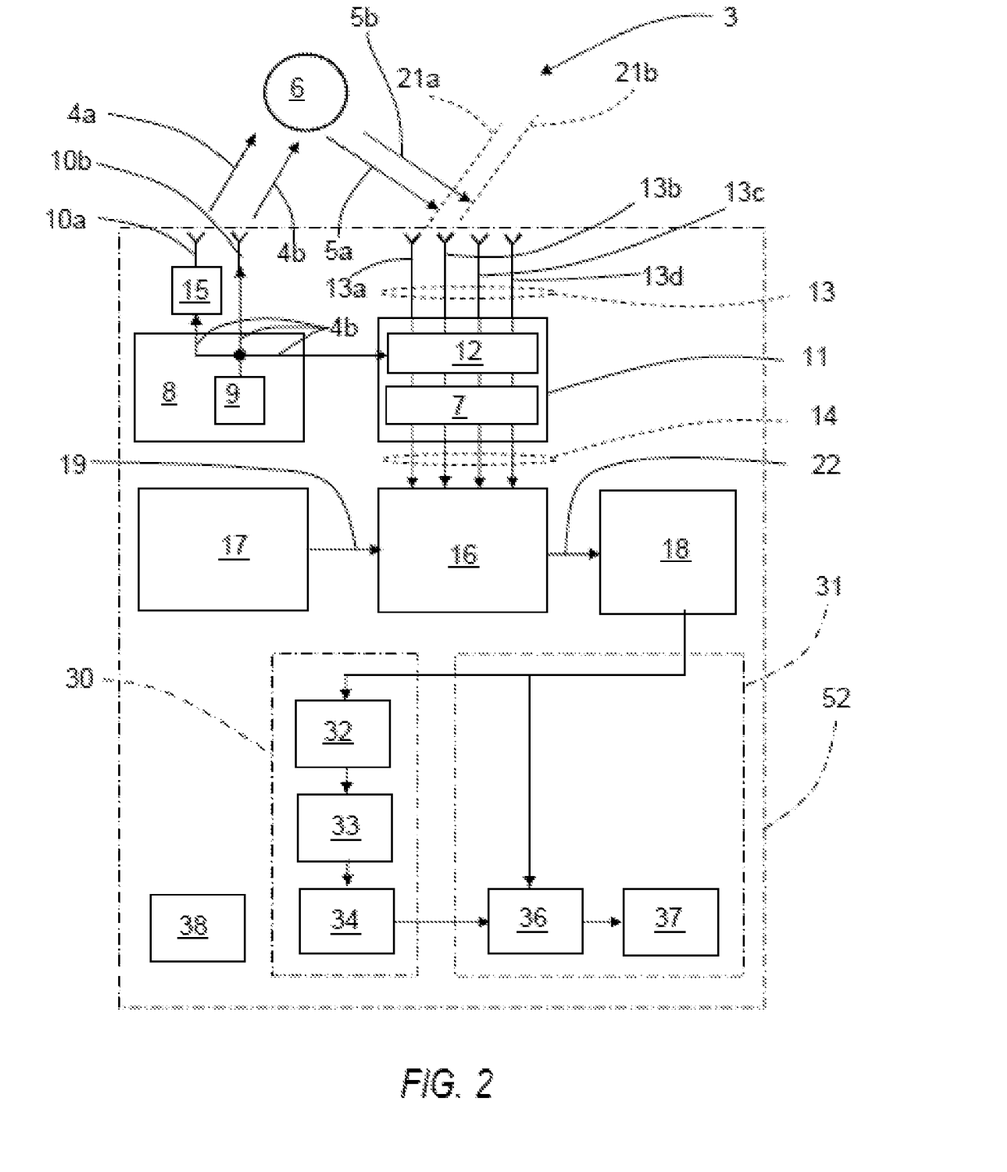
FIG. 2 shows a simplified schematic of a vehicle radar system.

With reference to both FIG. 1 and FIG. 2, FIG. 2 showing a simplified schematic of a vehicle radar system 3 according to a first example, the vehicle radar system 3 includes transceiver arrangement 52 that in turn includes a transmitter arrangement 8 which in turn includes a signal generator 9 that is arranged to generate FMCW (Frequency Modulated Continuous Wave) chirp signals of a previously known kind, a chirp signal being in the form of a continuous sinusoid where the frequency varies from a first low frequency to a second high frequency over the course of the ramp. The change in frequency from start to finish may for example be of the order of 0.5% of the starting frequency.

Figure 3A:
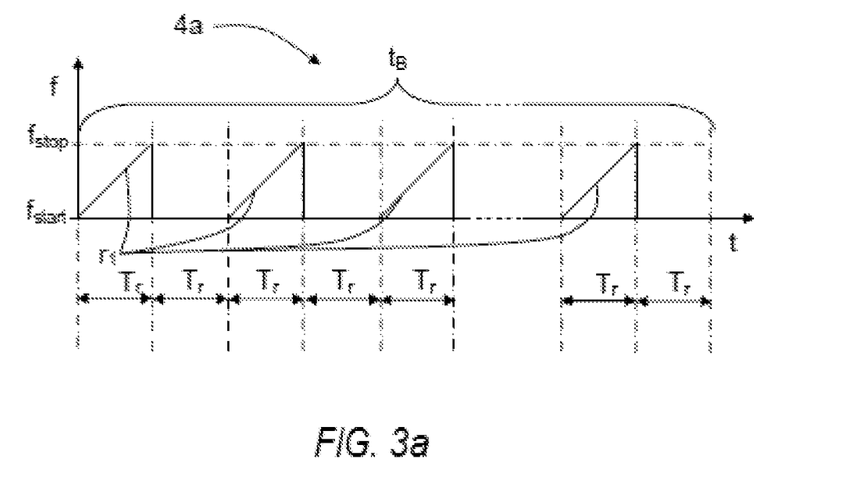
FIG. 3a shows a first chirp signal.

The transmitter arrangement 8 further includes a first transmitter antenna arrangement 10a and a second transmitter antenna arrangement 10b, each transmitter antenna arrangement 10a, 10b either being constituted by one antenna element or by an array of antenna elements, and being arranged to transmit a corresponding first chirp signal 4a and second chirp signal 4b, the second chirp signal 4b being shown in FIG. 3a with frequency on the Y-axis and time on the X-axis. The frequency varies from a first low frequency $f_{start}$ to a second high frequency $f_{stop}$ over the course of each ramp r (only three ramps indicated in FIG. 3a for the sake of clarity).

The transceiver arrangement 52 further includes a receiver arrangement 11, which receiver arrangement 11 in turn includes a receiver mixer 12 and a receiver antenna array 13, where the receiver antenna array 13 includes in one exemplary embodiment, four receiver antenna arrangements 13a, 13b, 13c, 13d. In the same way as for the transmitter antenna arrangements, each receiver antenna arrangement 13a, 13b, 13c, 13d may be constituted by one antenna element or by an array of antenna elements.

The transmitted signals 4a, 4b are reflected at a first object 6, and the reflected signals 5a, 5b are received by the receiver arrangement 11 via the receiver antenna arrangements 13a, 13b, 13c, 13d. The reflected signals 5a, 5b each have corresponding wave fronts 21a, 21b, one wave front for each reflected signals 5a, 5b being schematically indicated in FIG. 2. By detecting the phases of the received reflected signals 5a, 5b, the inclination of the wave fronts 21a, 21b may be calculated, providing an azimuth bearing angle to the object 6, in other words a direction of arrival or DOA.

The received signals 5a, 5b, thus constituted by reflected radar echoes, are mixed with the second chirp signal 4b in the receiver mixer 12, such that four corresponding IF (Intermediate Frequency) signals 14 are acquired. The difference frequency of the resulting IF signals relates to the target distance.

Figure 3B:
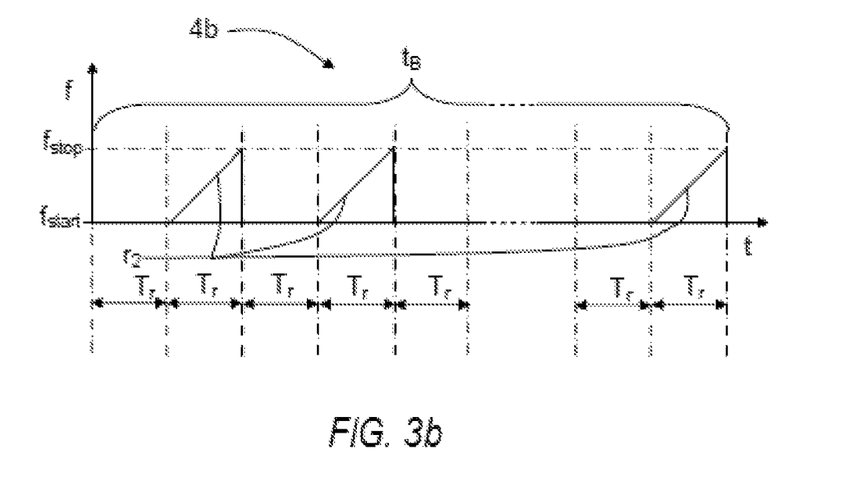
FIG. 3b shows a second chirp signal.

As shown in FIG. 3a, the first chirp signal 4a includes repeating cycles of a first plurality of frequency ramps $r_1$ and as shown in FIG. 3b, the second chirp signal 4b includes repeating cycles of a second plurality of frequency ramps $r_2$. As mentioned above, the frequency varies from a first frequency $f_{start}$ to a second frequency $f_{stop}$ over the course of each ramp $r_1$, $r_2$, where the magnitude of the first frequency $f_{start}$ falls below the magnitude of the second frequency $f_{stop}$.

In this example, each ramp lasts a certain ramp time $T_r$, the ramp time $T_r$ being the same for the first chirp signal 4a and the second chirp signal 4b. Between two consecutive ramps of the first chirp signal 4a as well as for the second chirp signal 4b there is also a ramp time Tr. The chirp signals 4a, 4b are timed such that between two consecutive ramps of the first chirp signal 4a there is ramp of the second chirp signal 4b and vice versa such that the chirp signals 4a, 4b are interleaved with each other.

In this way, improved angular accuracy and resolution is achieved since the number of Tx-Rx (transmit-receive) combinations is increased.

The transceiver arrangement 52 further includes an Analog to Digital Converter (ADC) arrangement 16 and a sampling and timing arrangement 17. The four corresponding IF signals 14 are transmitted from the receiver to the ADC arrangement 16 where the IF signals 14 are sampled at a certain predetermined sampling frequency $f_s$ and converted to digital signals 22, the sampling frequency $f_s$ being provided in the form of a sampling and timing signal 19 produced by the sampling and timing arrangement 17.

The transceiver arrangement 52 further includes a DSP (Digital Signal Processor) arrangement 18 that is adapted for radar signal processing by use of a first FFT (Fast Fourier Transform) to convert the digital signals 22 to a range domain, and a second FFT to combine the results from successive chirp signal ramps into the Doppler domain. This is shown in FIG. 4, where Doppler speed v in meter/second is shown on one axis, range R in meter on another axis with relative signal amplitude A in dB on a third axis.

Figure 4:
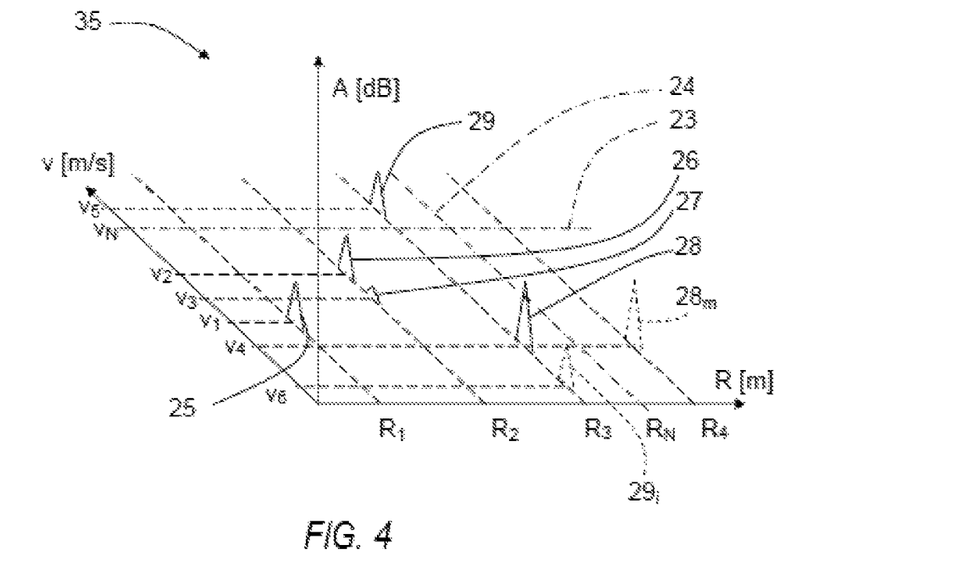
FIG. 4 shows a graphical representation of a Range-Doppler matrix.

FIG. 4 thus schematically provides a graphical representation of a Range-Doppler matrix 35. Here, a Nyquist speed $v_N$ and a Nyquist range $R_N$ are indicated with corresponding dash-dotted lines 23, 24. The vehicle radar system 3 suitably includes a main control unit 38, only schematically indicated in FIG. 2, that controls the working of certain components in the vehicle radar system 3.

At a first range $R_1$ there is a first target indication 25 detected at a first speed $v_1$; at a second range $R_2$ there is a second target indication 26 detected at a second speed $v_1$ and a third target indication 27 detected at a third speed $v_3$; at a third range $R_3$ there is a fourth target indication 28 detected at a fourth speed $v_4$. The fourth target indication 28 is mirrored in the Nyquist range $R_N$ line 24 such that a mirrored fourth target indication $28_m$ appears. The Range domain is the result of the first FFT, where targets further away appear at higher frequencies.

As a target increases in distance, it will start to alias, and appear as coming closer, which is undesirable. For example, if the fourth target indication 28 appears at an increasing frequency it would move towards a higher and higher range, towards and past the Nyquist range $R_N$ line 24, while the mirrored fourth target indication $28_m$ would move towards a lower and lower range, towards and past the Nyquist range $R_N$ line 24. Then the mirrored fourth target indication $28_m$ would be detected, constituting a false target indication.

A fifth target indication 29 appears at the third range $R_3$ at a fifth speed $v_5$ that exceeds the Nyquist speed $v_N$. Then, the fifth target indication 29 will appear as an imaginary fifth target indication $29_i$ at a lower sixth speed $v_6$ due to aliasing, constituting a false target indication.

The above false target indications will make identification of which target indication that is real more difficult. In order to counter-act this, the receiver arrangement includes an anti-aliasing filter 7. The anti-aliasing filter 7 has a sufficient degree of suppression beyond the present Nyquist frequency. This has the effect of removing one of the two tones from the chirp signals 4a, 4b and allows the ADC arrangement 16 to work reliably.

According to the present disclosure, the two-dimensional spectrum of the Range-Doppler matrix 35 is fed into two parallel processing paths, a first processing path 30 and a second processing path 31. The first processing path 30 includes a search module 32 and a dwell computation module 33, and is arranged to seek for useful signals, working independently from the rest of the signal processing in the background, producing a periodically updated dwell list 34. Moreover, the first processing path 30 serves as a firewall which is arranged to suppress adverse signals such as interference or ambiguous signals.

The second processing path 31 is arranged to extract specific spectral lines from the Range-Doppler matrix 35 and store them in a buffer structure. In addition to the Range-Doppler matrix input, an access to information about supposed targets is needed. For this purpose, the dwell list 34 is accessed by a dwelling module 36 that is present in the second processing path 31 and is arranged to collect data from the Range-Doppler matrix 35 in dependence of the present dwell list 34. The second processing path 31 further includes a target detection module 37.

By use of the dwell list 34, it is possible for the second processing path 31 to focus the processing efforts where there is an increased possibility for presence of objects.

An example of how these processing paths 30, 31 may work will be explained more in detail later.

Figure 5:
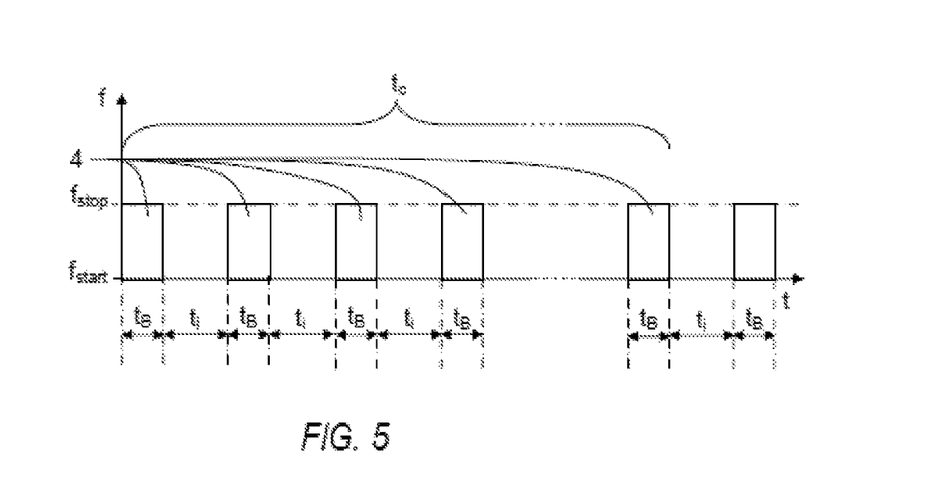
FIG. 5 shows pulse blocks during a cycle.

With reference to FIG. 3a, FIG. 3b and FIG. 5, each cycle has a duration of a cycle time $t_c$, where each cycle includes a plurality of pulse blocks 4, and where each pulse block 4 has a duration of a block time $t_B$. Between two consecutive pulse blocks 4 there is a certain idle time $t_i$. Each pulse block 4 includes the chirp signals 4a, 4b, and during the idle time $t_i$ between two consecutive pulse blocks 4 there are no chirp signals. A Range-Doppler matrix 35 is prepared for each pulse block 4, one at a time.

In FIG. 3a and FIG. 3b, the first chirp signal 4a and the second chirp signal 4b are shown during one such a pulse block 4, block time $t_B$.

It should be noted that the Doppler resolution performance of a single pulse block 4 is lower compared to a continuous pulse sequence. Furthermore, the integration gain is proportional to the acquisition time which results in a lower signal to noise ratio for a single pulse block 4.

In the following, the workings of the processing paths 30, 31 will be described more in detail.

The search module 32 is arranged to find Range-Doppler (RD) matrix elements which most likely contain energy of radar targets. For this purpose, the consistency of the magnitudes of the Range-Doppler matrix 35 is evaluated one at a time. Since the individual pulses are not saved, it is necessary to sequentially work through the process and get the most important information in compressed form. This may for example be accomplished by combining the pulse blocks 4 of one or more processing cycles with the aim to restore both the detection probability and the resolution using a so-called sequential probability ratio test (SPRT) algorithm, where this algorithm in general is previously well-known and here is run by use of the main control unit 38. The ideal implementation of a sequential detection algorithm requires a decision to be made after every pulse block 4, where three decision outcomes are possible: No Target, Target Present, and No Decision. If the latter decision is made, then another pulse block 4 is evaluated.

Figure 6:
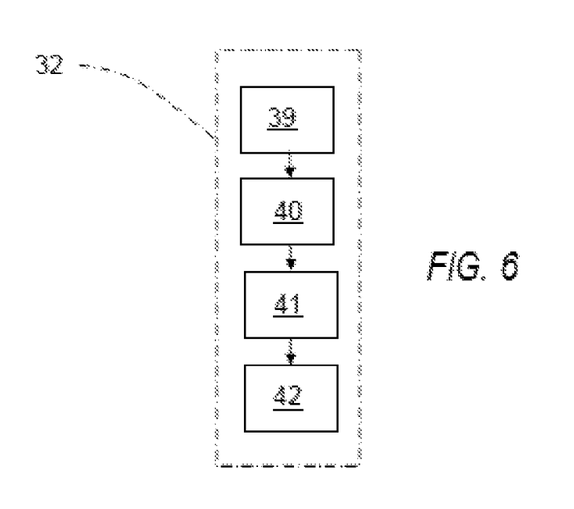
FIG. 6 shows details of a search module.

With reference to FIG. 6, the search module 32 includes a noise estimation module 39, an LLF (Log Likelihood Function) matrix alignment module 40, a probability ratio computation module 41 and LLF matrix updating module 42. The term LLF will be discussed in detail later in the description.

The noise estimation module 39 is arranged to estimate the noise floor for all ranges in the Doppler dimension within the Range-Doppler matrix 35 by employment of a median function.

The LLF matrix alignment module 40 is arranged to alter the LLF matrix since it is the nature of the Range-Doppler matrix 35 that frequencies in the range dimension are changing as a function of time. The so-called range-rate of the energy within a certain RD matrix element can be derived from the matrix element index in the Doppler dimension.

The probability ratio computation module 41 is arranged to perform sequential detection using the SPRT algorithm. In order to adapt this algorithm to radar sensors, a calculated signal magnitude, m, is assumed as based on the on-going collection of noisy radar signal observations, so far including N such observations. The function $f_0(m)$ is a probability density function for the calculated signal magnitude m, when an object is actually present at some specified magnitude, and the function $f_1(m)$ is the probability density function for the calculated signal magnitude m, when no such object is actually present.

A probability density function describes the likelihood of observing particular values of a random variable. In particular, the probability of observing values contained within a certain interval is determined by integrating the probability density function over that interval. As such, the value of the probability density function at any particular value is proportional to the probability of observing the random variable within an infinitesimal interval centered on the value. According to SPRT theory, the ratio, r, provides a measure of the relative probability r of the object being present or not:

$$r = \frac{f_0(m)}{f_1(m)} \quad (1)$$

The calculation of the probability density functions, $f_0(m)$ and $f_1(m)$, is dependent on the nature of the observation noise. In particular, the noise on both the real and imaginary part of the Range-Doppler matrix 35 of a single pulse block 4 is modeled as independent normal variants having zero mean and equal variance. Under this assumption, the probability density function for the no-target case, $f_1(m)$, follows a Rayleigh distribution:

$$f_1(m) = \frac{m}{\sigma^2} \cdot \exp\left(-\frac{m^2}{2 \cdot \sigma^2}\right) \quad (2)$$

Figure 7:
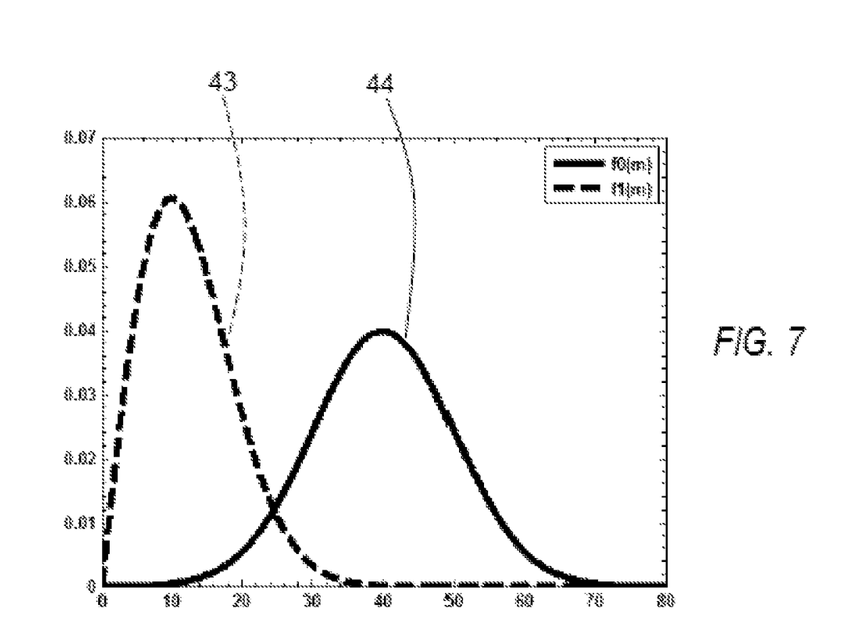
FIG. 7 shows a Rayleigh distribution and a Gaussian distribution.

The peak of a Rayleigh distribution occurs at the value of a. FIG. 7 illustrates a Rayleigh distribution for a σ equal to 10. The probability density function for the target-present case, $f_0(m)$, requires an assumed target magnitude. This magnitude has the interpretation that if a target is present with this magnitude, the specified probability of detection should be achieved. Thus, this magnitude is considered to be a threshold at which detection requirements will be satisfied.

Given the above-assumed signal noise characteristics, the probability density function for the target present case follows a Rice distribution. In practice, however, this can be approximated by the less complicated Gaussian distribution:

$$f_0(m) = \frac{1}{\sigma \cdot \sqrt{(2 \cdot \pi)}} \cdot \exp\left(-\frac{(m - m_T)^2}{2 \cdot \sigma^2}\right) \quad (3)$$

In the above equation, $m_T$ is the detection threshold at which the performance requirements are to be satisfied. The Gaussian distribution is a good approximation to the Rice distribution as long as the threshold, $m_T$, is at least 1.5 times larger than the noise standard deviation, s.

In FIG. 7, a Gaussian distribution 44 is illustrated for a noise standard deviation s equal to 10 and a detection threshold $m_T$ equal to 40. Note that the peak of the Gaussian distribution 44 occurs at the value of $m_T$. The detection threshold $m_T$ is determined as a multiple of the effective noise in a receiver channel, as described by the following equation:

$$m_T = D \cdot \sigma \quad (4)$$

In the above equation, the parameter D represents the desired noise multiplier that for example may have a value somewhere between 2.5 and 32. This corresponds to a threshold ranging from 8 dB to 30 dB above noise (i.e. 12 dB=20 $\log_{10}(4)$).

The ratio r of equation (1) may be transformed to a logarithmic form. The resulting expression is called the log-likelihood function (LLF), mentioned previously. In the following, the linear ratio of the functions $f_0(m)$ vs. $f_1(m)$ is illustrated:

$$r(m, \sigma) = \frac{\frac{1}{\sigma \cdot \sqrt{(2 \cdot \pi)}} \cdot \exp\left(-\frac{(m - D \cdot \sigma)^2}{2 \cdot \sigma^2}\right)}{\frac{m}{\sigma^2} \cdot \exp\left(-\frac{m^2}{2 \cdot \sigma^2}\right)} = \frac{\sqrt{2} \cdot \sigma \cdot e^{D \cdot m/\sigma - D^2/2}}{2 \cdot \sqrt{\pi} \cdot m} \quad (5)$$

The log-likelihood function is obtained by applying of the natural logarithm:

$$\text{Ln}(r(m, \sigma)) = \text{Ln}\left(\frac{\sigma}{m}\right) - \frac{\text{Ln}(2 \cdot \pi)}{2} - \frac{D^2}{2} + \frac{D \cdot m}{\sigma} \quad (6)$$

The LLF matrix updating module 42 is arranged for actual target signal detection. A target is decided to be present when the following inequality is satisfied for a first threshold A:

$$r > A \quad (7)$$

A target is decided to not be present when the following inequality is satisfied for a second threshold B:

$$r < B \quad (8)$$

If neither inequality is satisfied, it is not possible to make a decision another observation has to be collected. The first thresholds A and second threshold B can be based on a probability of detection (i.e., 1–a) and false alarm (i.e., b) requirements. In particular, the following approximations may be used:

$$A \approx \frac{1 - \beta}{\alpha} \quad (9)$$

$$B \approx \frac{\beta}{1 - \alpha} \quad (10)$$

Here, a denotes missed detection probability, e.g. 5%=>0.05; and 13 denotes false-alarm probability, e.g. 1%=>0.01.

For the incoherent version of the SPRT target detection each matrix element of the LLF matrix is summed up with the LLF value of the corresponding RD spectral line. This process is executed until either a noise decision is made, or until a target decision can be done. This relationship can be expressed by the following inequality:

$$B < \sum_{i=1}^{N}\left(\text{Ln}\left(\frac{\sigma_i}{m_i}\right) - \frac{\text{LN}(2\cdot\pi)}{2} - \frac{D^2}{2} + \frac{D\cdot m_i}{\sigma_i}\right) < A \quad (11)$$

With renewed reference to FIG. 2, the dwell computation module 33 is arranged to be executed at the end of every RSP (Radar Signal processing) cycle, and is arranged to select range-velocity combinations that most likely contain energy of radar targets. In addition the dwell buffer is initialized and the dwell list 34 is rewritten as preparation for the next RSP cycle.

Figure 8:
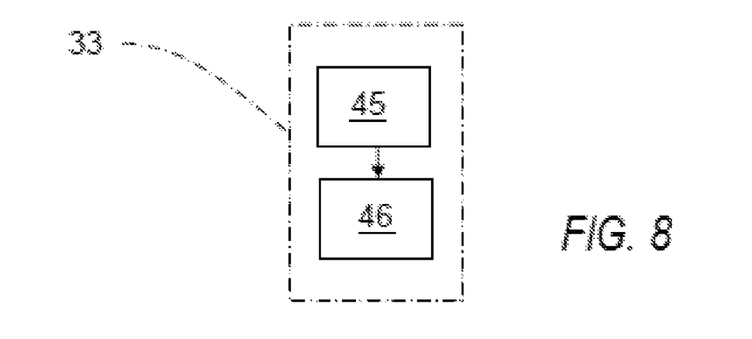
FIG. 8 shows details of a dwell computation module.

With reference to FIG. 8, the dwell computation module 33 includes a RD matrix element identification module 45 and a dwell position calculation module 46.

The RD matrix element identification module 45 is arranged to investigated whether the matrix elements contents of the latest LLF matrix exceeds the designated first threshold A.

In order to illustrate the dwell position calculation module 46, it is assumes that a proper cell is found in the LLF matrix having a range index of $i_R$ and a Doppler index of $i_D$. The corresponding dwell position $i_{pR}/i_{pD}$ is calculated as follows. Since the basic approach of an SAD (Search And Dwell) algorithm assumes a constant velocity, the Dwell index, i.e. position of Range-Doppler (RD) matrix elements of interest for dwelling, can be taken over from the LLF matrix:

$$i_{pD} = i_D \quad (12)$$

In order to lose as little energy as possible during the dwelling process, it is desired to put the measuring point at the optimum position. The calculation is basically the prediction of the target position using the current position, i.e. $i_R$, dwell duration, i.e. $T_c$, and the target speed represented by the Doppler index, i.e. $i_D$. The best projection time point t would be when the dwell-period is progressed halfway; which may be expressed as $t = 0.5 \cdot N_R \cdot T_R$, where $N_R$ is the number of ramps $r_1$, $r_2$ in one pulse block 4.

$$i_{pR} = i_R + \frac{N_R \cdot T_R \cdot V_{RES} \cdot f_D(i_D)}{2 \cdot R_{RES}} \quad (13)$$

The function $f_D(i_D)$ represents the interpretation of the Doppler index $i_D$. Since the RD spectrum has a limited Doppler Nyquist speed $v_N = v_{RES} \cdot N_R$, where $v_{RES}$ is the Doppler resolution, it is necessary to define the operation range of the target velocities. This function $f_D(i_D)$ returns an integer value which is a multiplier for the Doppler resolution in order to obtain the velocity represented by the Doppler index $i_D$. The simplest example is to center the velocity range of values on zero. One implementation of such function might be:

$$f_D(i_D) = \begin{cases} \text{if } i_D < N_R/2: & i_D - 1 \\ \text{else:} & i_D - N_R - 1 \end{cases} \quad (14)$$

There are of course alternative ways to compensate for the coherency losses caused by range rate of the radar targets. For example, it is conceivable that the Range-Doppler matrix 35 is aligned by frequency multiplication with respect to change in position prior to the actual transformation. This is however only an additional example, and will not be discussed further here.

With renewed reference to FIG. 2, the dwelling module 36 that is present in the second processing path 31 is arranged to collect data from the Range-Doppler matrix 35 in dependence of the present dwell list 34. This list is cyclically created from the search module 32. The number $N_{DP}$ of values to be stored depends on the size of the dwell buffer. The length $N_{SP}$ of the buffer may have limitations such as the RSP cycle time.

Figure 9:
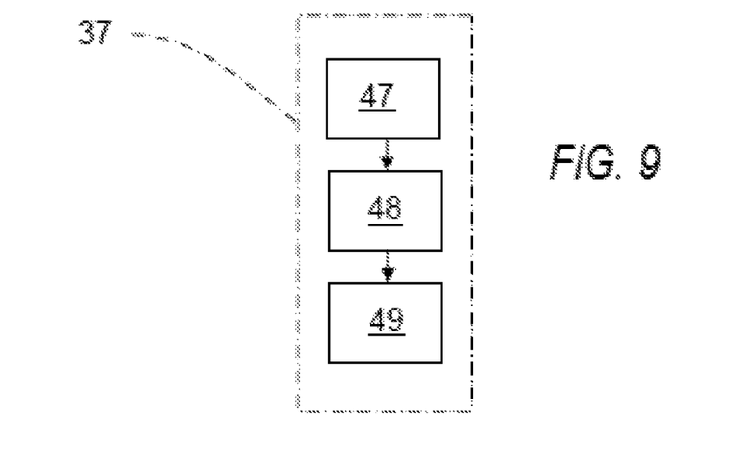
FIG. 9 shows details of a target detection module.

The second processing path 31 further includes the target detection module 37 that is arranged to evaluate the stored data in the dwell buffer. With reference to FIG. 9, the target detection module 37 includes a dwell data transformation module 47, a peak detection module 48 and a parameter estimation module 49.

The dwell data transformation module 47 is arranged to apply a proper window function to each dwell signal. Moreover, all dwell signals have to be transferred into the frequency domain; actually the third dimension of a spectral cube.

Here, each dwell signal is considered to constitute an independent Doppler signal with following properties:

The Doppler resolution of a dwell probe, $V_{RES\_DP}$:

$$V_{RES\_DP} = \frac{C_0}{N_{SP} \cdot T_{SP} \cdot (F_U + F_L)} \quad (15)$$

The Doppler Nyquist of a dwell probe, $V_{N\_DP}$:

$$V_{N\_DP} = V_{RES\_DP} \cdot N_{SP} \quad (16)$$

The peak detection module 48 includes a detection algorithm where a magnitude signal is created from the complex FFT output. Then, the noise floor is estimated for each signal. After this a detection threshold is calculated. In the last step, all local maxima above the threshold are declared as targets.

The parameter estimation module 49 is arranged to calculate all parameters, i.e. range, Doppler and bearing. For this purpose, it is necessary to consider the orthogonal neighboring matrix elements in the three-dimensional signal space of every target peak. With the magnitudes of the neighbors, a 3-point interpolation may be applied, and the target distance can be calculated using the equation $$R_{RES} = \frac{N_S - 1}{N_S} \cdot \frac{C_0}{2 \cdot BW} \quad (17)$$

where $R_{res}$ is the range resolution, Ns is the number of samples per Tx ramp $r_1$, $r_2$, BW is the Tx frequency bandwidth and $C_0$ is the speed of light in vacuum. With $R_{RES}$ and the spectral peak position, the target distance may be calculated.

The determination of the target speed requires the Doppler calculation from the RD matrix 35 of one pulse block 4 according to $$V_{RES} = \frac{N_R - 1}{N_R} \cdot \frac{C_0}{(T_{SP}(t_B - T_R) \cdot (f_{start} - f_{stop}))} \quad (18)$$

or simplified, $$V_{RES} = \frac{C_0}{N_R \cdot 7 N_R \cdot T_R \cdot (f_{start} - f_{stop})} \quad (19)$$

in combination with the calculation of the Dwell signal according to equation (15) and (16) above.

Although the Dwell signal provides an accurate Doppler estimation it has a relatively low Nyquist speed. By combining the Doppler calculation and the calculation of the Dwell signal an enhanced accuracy can be achieved.

This is possible if a Nyquist hypothesis is determined by using the result of the rough calculation. It should be noted this technique assumes that the accuracy of the coarse method is higher than the Nyquist speed of the fine calculation. Regarding the term Nyquist hypothesis, an FFT has a limited range of values, a Nyquist range. If it also is desired to measure targets outside of this range, it is required to know both the peak position and the number of ambiguity wraps within the FFT. Here, one wrap is one Nyquist hypothesis.

The main advantage of the SPRT algorithm is that the memory for the IF signal 14 can be released after every processing step, i.e. after every pulse block 4.

This approach results in a plurality of advantages, for example:
Reduced memory requirements.
Flexible observation time.
Negligible signal smear at higher velocity.
Resolvability of Doppler ambiguities. This can be achieved by analyzing the frequency shift over time in the range dimension.
Slower Tx ramps possible, which would lead to a lower sampling rate.

The essence of the present disclosure is that the two-dimensional spectrum of the Range-Doppler matrix 35 is fed into a first processing path 30 and a second processing path 31. The first processing path 30 is arranged to produce a periodically updated dwell list 34, and the second processing path 31 is arranged to collect and process data from the Range-Doppler matrix 35 in dependence of the present dwell list 34. By use of the dwell list 34, it is possible for the second processing path 31 to focus the processing efforts for true target detection where there is an increased possibility for presence of objects. The dwell list includes information where the probability of presence of objects exceeds a certain threshold.

Exactly how this is accomplished may vary, the example disclosed above is only an example, and the processing may be performed in the main control unit 38 which in turn may be comprised by one or more separate or integrated control units. There may be one main control unit 38 for each transceiver arrangement 52, or one main control unit 38 for the vehicle radar system 3.

Figure 10:
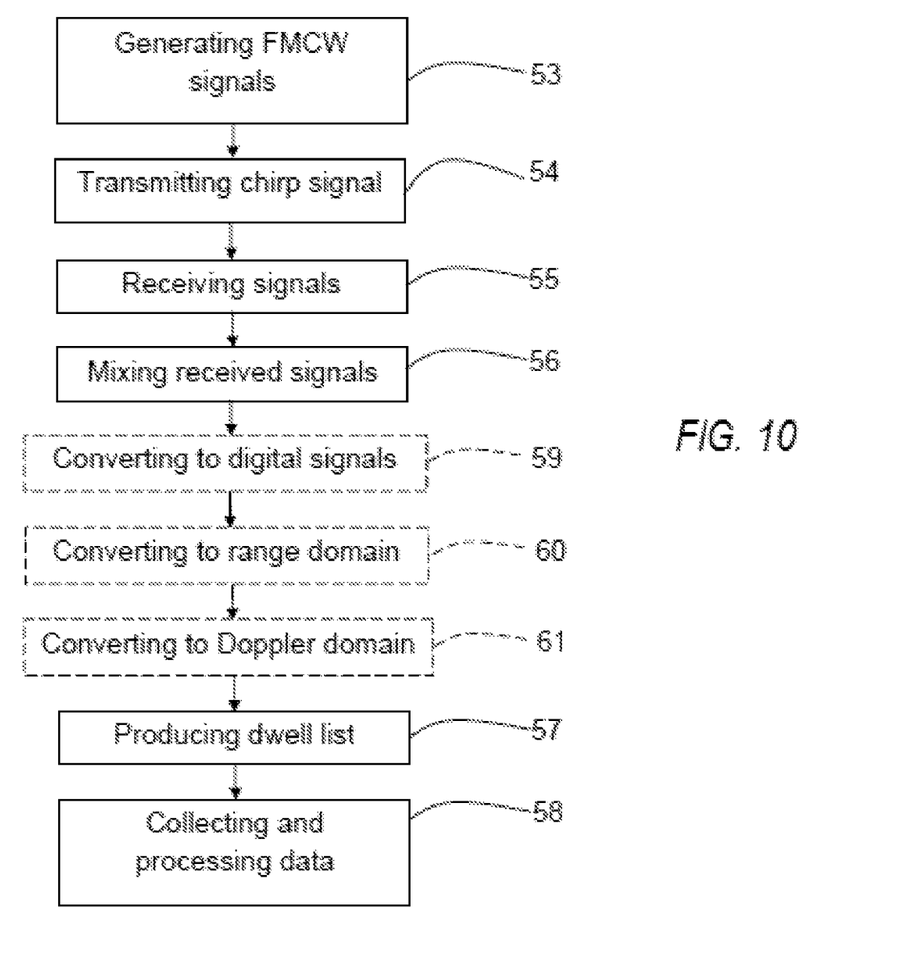
FIG. 10 shows a flowchart for a method according to the present disclosure.

With reference to FIG. 10, the present disclosure also relates to a method for a vehicle radar system (3), where the method includes:
Step 53: Generating at least one FMCW (Frequency Modulated Continuous Wave) chirp signal 4a, 4b.
Step 54: Transmitting the at least one chirp signal 4a, 4b, where each chirp signal 4a, 4b includes a corresponding plurality of frequency ramps $r_1$, $r_2$.
Step 55: Receiving reflected signals 5a, 5b.
Step 56: Mixing the received signals 5a, 5b with the respective transmitted chirp signal 4a, 4b to obtain at least one IF (Intermediate Frequency) signal 14.
Step 57: Producing a periodically updated dwell list 34.
Step 58: Collecting and processing data in dependence of the present dwell list 34, where the dwell list 34 includes information where the probability of presence of objects exceeds a certain threshold.
According to an example, the method further includes:
Step 59: Converting the IF signals 14 to digital signals 22.
Step 60: Converting the digital signals 22 to a range domain by use of a first FFT (Fast Fourier Transform).
Step 61: Combining the results from successive chirp signal ramps into the Doppler domain by use of a second FFT, such that a plurality of Range-Doppler matrices 35 is obtained.

As indicated in FIG. 1, the vehicle 1 includes a safety control unit 50 and safety system 51, for example an emergency braking system and/or an alarm signal device. The safety control unit 50 is arranged to control the safety system 51 in dependence of input from the radar system 3. Such input may be input via the main control unit 38.

The present disclosure is not limited to the examples above, but may vary freely within the scope of the appended claims. For example, ramp time $T_r$ does not have to be the same for the first chirp signal 4a and the second chirp signal 4b; and the times between consecutive ramps $r_1$, $r_2$ not have to be the same for the first chirp signal 4a and the second chirp signal 4b as well. The first chirp signal 4a and the second chirp signal 4b do not have to be interleaved, but may run at the same time or independently of each other during each block 4. Furthermore, the chirp signals 4a, 4b may be transmitted in any kind of cycles; the pulse blocks 4 described is only an example. When the chirp signals 4a, 4b are interleaved with each other, they may be interleaved in each pulse block 4.

All times mentioned are of course only mentioned by way of example, any suitable times and timing schedules are clearly possible in a radar system according to the above. The ramp may similarly be configured as an up-ramp as described, or a down-ramp, or some combination of both. The magnitude of the first frequency $f_{start}$ may thus exceed the magnitude of the second frequency $f_{stop}$.

Furthermore, there may be any number of transmitter antenna arrangements 10a, 10b and receiver antenna arrangements 13a, 13b, 13c, 13d, but there is at least one transmitter antenna arrangement and at least one receiver antenna arrangement. There may thus be one or more FMCW chirp signals, having any suitable cycle constitution.

Each antenna arrangement 10a, 10b; 13a, 13b, 13c, 13d may for example comprise on or more antennas, and each antenna may be constituted by one antenna element or by an array of antenna elements.

If the chirp signals 4a, 4b are interleaved, a ramp in the first chirp signal 4a does thus not have to start exactly when a preceding ramp in the second chirp signal 4b ends, but the start may be either after or before the end of the second chirp signal 4b, and vice versa.

The radar system may be implemented in any type of vehicle such as cars, trucks and buses as well as boats and aircraft.

The schematics of vehicle radar systems are simplified, only showing parts that are considered relevant for an adequate description of the present disclosure. It is understood that the general design of radar systems of this kind is well-known in the art. For example, no devices that are arranged to use the acquired target information is shown, but many different such devices are of course conceivable; for example a warning and/or collision avoidance system.

The number of antenna arrangements, antennas within each antenna arrangement and IF signals may vary.

The ADC arrangement and the DSP arrangement should each one be interpreted as having a corresponding ADC or DSP functionality, and may each be constituted by a plurality of separate components. Alternatively, each ADC arrangement may be comprised in one ADC chip, and each DSP arrangement may be comprised in one DSP chip.

In the example shown, there has only been one receiver channel. Of course, a receiver in this context may be arranged for a plurality of channels.

Generally, the hardware used to generate the radar signal may be active only for part of the cycle period and powered down for the rest of the cycle, i.e. when it is not needed.

The vehicle radar system 3 has been shown having one transceiver arrangement 52; of course the vehicle radar system 3 may include two or more transceiver arrangement having the same or different structures, including similar or different components. Each transceiver arrangement 52 may comprise control units.

Each chirp signal 4a, 4b may include at least one cycle of a corresponding plurality of frequency ramps $r_1$, $r_2$. Each chirp signal 4a, 4b may alternatively comprise a corresponding plurality of continuously running frequency ramps $r_1$, $r_2$.

Generally, the present disclosure relates to a vehicle radar system 3 including at least one transceiver arrangement 52, each of the at least one transceiver arrangement 52 being arranged to generate and transmit a least one FMCW (Frequency Modulated Continuous Wave) chirp signal 4a, 4b, where each chirp signal 4a, 4b includes a corresponding plurality of frequency ramps $r_1$, $r_2$, where the vehicle radar system 3 is arranged to receive reflected signals 5a, 5b and to mix the received signals 5a, 5b with the respective transmitted chirp signal 4a, 4b to obtain at least one IF, Intermediate Frequency, signal 14, wherein the vehicle radar system 3 further is arranged to produce a periodically updated dwell list 34, and to collect and process data in dependence of the present dwell list 34, where the dwell list 34 includes information where the probability of presence of objects exceeds a certain threshold.

According to an example, each of the at least one transceiver arrangement 52 is arranged to:
Convert the IF signals 14 to digital signals 22,
Convert the digital signals 22 to a range domain by use of a first FFT (Fast Fourier Transform) and to
Combine the results from successive chirp signal ramps into the Doppler domain by use of a second FFT, such that a plurality of Range-Doppler matrices 35 is obtained.

According to an example embodiment of the present invention, the vehicle radar system 3 is arranged to feed the two-dimensional spectrum of each Range-Doppler matrix 35 into a first processing path 30 and a second processing path 31, where the first processing path 30 is arranged to produce the dwell list 34, and where the second processing path 31 is arranged to collect and process data from each Range-Doppler matrix 35 in dependence of the dwell list 34.

According to an example embodiment of the present invention, each transceiver arrangement 52 includes a signal generator 9 and is arranged to transmit a first chirp signal 4a and a second chirp signal 4b.

According to an example embodiment of the present invention, the chirp signals 4a, 4b are timed such that between two consecutive ramps of the first chirp signal 4a there is ramp of the second chirp signal 4b and vice versa such that the chirp signals 4a, 4b are interleaved with each other.

According to an example embodiment of the present invention, each chirp signal 4a, 4b includes a corresponding plurality of frequency ramps $r_1$, $r_2$ formed in pulse blocks 4, where each pulse block 4 has a duration of a block time $t_B$ with an idle time $t_i$ between two consecutive pulse blocks 4, where furthermore each pulse block 4 includes the chirp signal 4a, 4b and where there is no chirp signal during the idle time $t_i$.

According to an example embodiment of the present invention, the radar system 3 is arranged to combine pulse blocks 4 by use of a Sequential Probability Ratio Test (SPRT) algorithm.

According to an example embodiment of the present invention, the radar system 3 is arranged to provide input to a safety control unit 35 that in turn is arranged to control safety means system 36, where the radar system 3, the safety control unit 35 and the safety system 36 are provided-in a vehicle 1.

Generally, the present disclosure also relates to a method for a vehicle radar system 3, where the method includes:
Step 53: generating at least one FMCW (Frequency Modulated Continuous Wave) chirp signal 4a, 4b;
Step 54: transmitting the at least one chirp signal 4a, 4b, where each chirp signal 4a, 4b includes a corresponding plurality of frequency ramps $r_1$, $r_2$;
Step 55: receiving reflected signals 5a, 5b; and Step 56: mixing the received signals 5a, 5b with the respective transmitted chirp signal 4a, 4b to obtain at least one IF, Intermediate Frequency, signal 14; wherein the method further includes:
Step 57: producing a periodically updated dwell list 34; and
Step 58: collecting and processing data in dependence of the present dwell list 34, where the dwell list 34 includes information where the probability of presence of objects exceeds a certain threshold.

According to an example embodiment of the present invention, the method includes:
Step 59: converting the IF signals 14 to digital signals 22;
Step 60: converting the digital signals 22 to a range domain by use of a first FFT (Fast Fourier Transform) and
Step 61: combining the results from successive chirp signal ramps into the Doppler domain by use of a second FFT; such that a plurality of Range-Doppler matrices 35 is obtained.

According to an example embodiment of the present invention, the method includes feeding the two-dimensional spectrum of each Range-Doppler matrix 35 into a first processing path 30 and a second processing path 31, where the first processing path 30 is used for producing the dwell list 34, and where the second processing path 31 is used for collecting and processing data from each Range-Doppler matrix 35 in dependence of the dwell list 34.

According to an example embodiment of the present invention, there is a first chirp signal 4a and a second chirp signal 4b, where the chirp signals 4a, 4b are timed such that between two consecutive ramps of the first chirp signal 4a there is ramp of the second chirp signal 4b and vice versa such that the chirp signals 4a, 4b are interleaved with each other.

According to an example embodiment of the present invention, each chirp signal 4a, 4b has a corresponding plurality of frequency ramps $r_1$, $r_2$ formed in pulse blocks 4, where each pulse block 4 has a duration of a block time $t_B$ with an idle time $t_i$ between two consecutive pulse blocks 4, where furthermore each pulse block 4 includes the chirp signal 4a, 4b and where there is no chirp signal during the idle time $t_i$.

According to an example embodiment of the present invention, the method further includes combining pulse blocks 4 using a Sequential Probability Ratio Test (SPRT) algorithm.

While the above description constitutes the preferred embodiment of the present invention, it will be appreciated that the invention is susceptible to modification, variation an change without departing from the proper scope and fair meaning of the accompanying claims.

The invention claimed is:

1. A vehicle radar system comprising:
at least one transceiver arrangement, the at least one transceiver arrangement being configured to generate and transmit a Frequency Modulated Continuous Wave (FMCW) chirp signal, where the chirp signal includes a corresponding plurality of frequency ramps, where the vehicle radar system is configured to receive reflected signals and to mix the received reflected signals with the respective transmitted chirp signal to obtain at least one Intermediate Frequency (IF) signal;
wherein the vehicle radar system is configured to produce a periodically-updated dwell list and to collect and process data in dependence of the periodically-updated dwell list, where the periodically-updated dwell list includes information where the probability of presence of one or more objects exceeds a certain threshold;
wherein the at least one transceiver arrangement is further configured to:
convert the IF signals to digital signals,
convert the digital signals to a range domain by use of a first Fast Fourier Transform (FFT),
combine the results from a successive of the chirp signal into the Doppler domain by use of a second FFT to obtain a plurality of Range-Doppler matrices, and
feed a two-dimensional spectrum of a Range-Doppler matrix of the plurality of Range-Doppler matrices into a first processing path and a second processing path, where the first processing path is configured to produce the periodically-updated dwell list by determining elements of the Range-Doppler matrix which are most likely to contain energy of radar targets using a log-likelihood function (LLF), and where the second processing path is configured to collect and process data to detect targets from the Range-Doppler matrix in dependence of the periodically-updated dwell list,
wherein the log-likelihood function (LLF) computes a natural log of a ratio of a first probability distribution function to a second probability distribution function, with the first probability distribution function representing a probability that an object is present at a specified signal magnitude, and with the second probability distribution function representing a probability that no object is present at the specified signal magnitude.

2. The vehicle radar system according to claim 1, wherein the log-likelihood function is computed as $$r(m,\sigma) = \frac{\sqrt{2\sigma e^{D\frac{m}{\sigma^2}D^2/2}}}{2\sqrt{\pi m}}.$$

3. The vehicle radar system according to claim 1, wherein the second probability distribution function follows a Rayleigh distribution.

4. The vehicle radar system according to claim 3, wherein the second probability distribution function is computed as:

$$f_1(c) = \frac{m}{\sigma^2} \cdot \exp\left(-\frac{m^2}{2\cdot\sigma^2}\right).$$

5. The vehicle radar system according to claim 1, wherein the first probability distribution function follows a Rice distribution.

6. The vehicle radar system according to claim 5, wherein the first probability distribution function is approximated by a Gaussian distribution.

7. The vehicle radar system according to claim 5, wherein the first probability distribution function is computed as:

$$f_0(m) = \frac{1}{\sigma\cdot\sqrt{(2\cdot\pi)}} \cdot \exp\left(-\frac{(m-m_T)^2}{2\cdot\sigma^2}\right).$$

8. The vehicle radar system according to claim 1, wherein the first processing path comprises a search module and a dwell computation module, with the search module configured to find the elements of the Range-Doppler matrix which are most likely to contain energy of radar targets, and with the dwell computation module configured to select range-velocity combinations that are most likely to contain energy of radar targets.

9. The vehicle radar system according to claim 8, wherein the search module includes a noise estimation module, where the noise estimation module is configured to estimate a noise floor for all ranges in the Doppler dimension within the Range-Doppler matrix using a median function.

10. The vehicle radar system according to claim 8, wherein the search module includes an LLF matrix alignment module configured to generate an LLF matrix based upon the Range-Doppler matrix by determining a range-rate of energy within a given element of the Range-Doppler matrix using a matrix element index in the Doppler dimension.

11. The vehicle radar system according to claim 8, wherein the search module includes a probability ratio computation module configured to perform sequential detection using a sequential probability ratio test (SPRT) algorithm.

12. The vehicle radar system according to claim 11, wherein the target detection module includes a dwell data transformation module, where the dwell data transformation module is configured to transfer a dwell signal from the dwell buffer into the frequency domain.

13. The vehicle radar system according to claim 12, wherein the parameter estimation module is configured to apply a 3-point interpolation to the plurality of orthogonal neighboring matrix elements of the target in three-dimensional signal space.

14. The vehicle radar system according to claim 12, wherein the parameter estimation module is configured to calculate a target distance to the target using the equation $$R_{RES} = \frac{N_S-1}{N_S} \cdot \frac{C_0}{2\cdot BW}.$$

15. The vehicle radar system according to claim 12, wherein the parameter estimation module is configured to calculate a target speed of the target using the equation $$V_{RES} = \frac{C_0}{N_R \cdot 7N_R \cdot T_R \cdot (f_{start} - f_{stop})}.$$

16. The vehicle radar system according to claim 11, wherein the target detection module includes a peak detection module, where the peak detection module includes a detection algorithm configured to identify targets by:
creating a magnitude signal from an output of a complex FFT,
estimating a noise floor for the dwell signal,
calculating a detection threshold, and
designating a local maxima that exceeds the detection threshold as a target.

17. The vehicle radar system according to claim 11, wherein the target detection module includes a parameter estimation module configured to calculate the parameters of the target using a plurality of orthogonal neighboring matrix elements of the target in a three-dimensional signal space.

18. The vehicle radar system according to claim 8, wherein the search module includes an LLF matrix updating module configured to detect an actual target signal by comparing the ratio of the first probability distribution function to the second probability distribution function with one or more threshold values.

19. The vehicle radar system according to claim 8, wherein the dwell computation module includes a Range-Doppler (RD) matrix element identification module and a dwell position calculation module, where the RD matrix element identification module is configured to determine whether a given element of the LLF matrix exceeds a first threshold value, and where the dwell position calculation module is configured to compute a dwell position using a range index value and a Doppler index value of the given element of the LLF matrix.

20. The vehicle radar system according to claim 1, wherein the second processing path comprises a dwelling module and a target detection module, where the dwelling module is configured to store data in a dwell buffer using the Range-Doppler matrix in dependence of the present dwell list, and where the target detection module is configured to evaluate the data stored in the dwell buffer to calculate parameters of a target, the parameters of the target including a range parameter, a Doppler parameter, and a bearing parameter.

* * * * *